(12) United States Patent
Vedula et al.

(10) Patent No.: US 9,548,981 B2
(45) Date of Patent: Jan. 17, 2017

(54) METHOD AND SYSTEM FOR PROVIDING SECURITY FOR UNIVERSAL PLUG AND PLAY OPERATIONS IN A HOME NETWORK ENVIRONMENT BASED ON OWNERSHIP RIGHTS

(75) Inventors: Kiran Bharadwaj Vedula, Bangalore (IN); Jong-Hyo Lee, Bangalore (IN)

(73) Assignee: Samsung Electronics Co., Ltd (KR)

( * ) Notice: Subject to any disclaimer, the term of this patent is extended or adjusted under 35 U.S.C. 154(b) by 148 days.

(21) Appl. No.: 13/809,370

(22) PCT Filed: Jul. 11, 2011

(86) PCT No.: PCT/KR2011/005071
§ 371 (c)(1),
(2), (4) Date: Jan. 9, 2013

(87) PCT Pub. No.: WO2012/005560
PCT Pub. Date: Jan. 12, 2012

(65) Prior Publication Data
US 2013/0117825 A1    May 9, 2013

(30) Foreign Application Priority Data
Jul. 9, 2010   (IN) .......................... 1965/CHE/2010

(51) Int. Cl.
*G06F 17/30*    (2006.01)
*H04L 29/06*    (2006.01)
*H04L 12/28*    (2006.01)

(52) U.S. Cl.
CPC ............ *H04L 63/10* (2013.01); *H04L 12/282* (2013.01)

(58) Field of Classification Search
None
See application file for complete search history.

(56) References Cited

U.S. PATENT DOCUMENTS

| 7,281,264 B2 | 10/2007 | Shieh | |
| 2004/0139343 A1* | 7/2004 | Shieh | ........................... 713/200 |
| 2005/0283619 A1* | 12/2005 | Min | ...................... G06F 21/33 |
| | | | 713/182 |
| 2006/0031459 A1 | 2/2006 | Ahn et al. | |

(Continued)

FOREIGN PATENT DOCUMENTS

| CN | 1669267 | 9/2005 |
| CN | 101184063 | 5/2008 |

(Continued)

OTHER PUBLICATIONS

PCT/ISA/237 Written Opinion issued on PCT/KR2011/005071 (pp. 5).
PCT/ISA/210 Search Report issued on PCT/KR2011/005071 (pp. 3).

*Primary Examiner* — Mohammed Waliullah
(74) *Attorney, Agent, or Firm* — The Farrell Law Firm, P.C.

(57) ABSTRACT

A method and system for providing security to Universal Plug and Play (UPnP) operations in a home network environment based on ownership rights where a request is received from a Control Point (CP) to perform an UPnP action associated with an UPnP resource. It is determined whether the CP holds an ownership right to perform the UPnP action based on ownership data associated with the UPnP resource. Accordingly, the CP is authorized to execute the UPnP action on the UPnP resource or an error message is returned to the CP based on the ownership of the UPnP resource.

13 Claims, 9 Drawing Sheets

(56) References Cited

U.S. PATENT DOCUMENTS

| | | |
|---|---|---|
| 2007/0157295 A1 | 7/2007 | Mangalore et al. |
| 2007/0208948 A1* | 9/2007 | Costa-Requena ....... H04L 63/20 713/185 |
| 2009/0064344 A1 | 3/2009 | Kim et al. |
| 2009/0125522 A1* | 5/2009 | Kodama ........... G06F 17/30165 |

FOREIGN PATENT DOCUMENTS

| | | |
|---|---|---|
| KR | 1020080029686 | 4/2008 |
| WO | WO 2005/046166 | 5/2005 |

* cited by examiner

METHOD AND SYSTEM FOR PROVIDING SECURITY FOR UNIVERSAL PLUG AND PLAY OPERATIONS IN A HOME NETWORK ENVIRONMENT BASED ON OWNERSHIP RIGHTS

PRIORITY

This application is a National Phase Entry of PCT International Application No. PCT/KR2011/005071, which was filed Jul. 11, 2011, and claims priority to Indian Patent Application No. 1965/CHE/2010, filed in the Indian Intellectual Property Office, on Jul. 9, 2010, the content of each of which is incorporated herein by reference.

BACKGROUND OF THE INVENTION

1. Field of the Invention

The present invention relates generally to the field of Universal Plug and Play (UPnP) home network system, and more particularly to a method and system for providing security for UPnP operations in a home network environment based on ownership rights.

2. Description of the Related Art

Universal plug and play (UPnP) is a set of computer network protocols promulgated by the UPnP forum. The goals of UPnP are to allow access to connect seamlessly and to simplify implementation of networks (e.g., data sharing, communications, and entertainment) within homes and corporate environments. These goals are achieved by defining and publishing UPnP device control protocols built upon open, Internet-based communication standards.

The UPnP technology can cater to a wide range of devices in a home network. The UPnP provides discovery, control and event related mechanisms. Discovery is enabled using a Simple Service Discovery Protocol (SSDP) protocol. Event mechanisms follow the General Event Notification Architecture (GENA) protocol. Using these technologies, UPnP makes availability and unavailability of the UPnP devices on the fly to the other devices in the UPnP home network.

UPnP architecture allows peer-to-peer networking of Personal Computers (PCs), networked appliances, and wireless devices. It is distributed, open architecture based on established standards such as Transport Control Protocol/Internet Protocol (TCP/IP), User Datagram Protocol (UDP), Hypertext Transfer Protocol (HTTP) and eXtended Mark-up Language (XML). The UPnP architecture supports zero configuration networking. For example, an UPnP compatible device from any vendor can dynamically join a network, obtain an IP address, announce its name, convey its capabilities upon request, and learn about the presence and capabilities about other devices. On the other hand, the UPnP devices can leave the UPnP home network automatically without leaving any unwanted state information on the network.

The foundation for UPnP networking is Internet Protocol (IP) addressing. Each UPnP device includes a Dynamic Host Configuration Protocol (DHCP) client which searches for a DHCP server when the UPnP device is first connected to the UPnP network. If no DHCP server is available, the UPnP device assigns itself an address. If during the DHCP transaction, the UPnP device obtains a domain name, for example, through a Domain Name System (DNS) server or via DNS forwarding, the UPnP device uses that name in subsequent network operations, otherwise the UPnP device uses its IP address.

UPnP defines device protection service as a generic security solution which can be used by all services defined in the UPnP. A device protection service defines concept of roles. All control points or control devices are assigned different roles, namely public, basic and admin for performing UPnP actions. Different DCPs and Vendors are free to extend these set of roles. However, the device protection service defines access control based only on actions and not on resources. In other words, the current device protection service fail to provide access control based on resources like Deployment Unit (DU), Execution Unit (EU) and Diagnostic tests (e.g., Ping, Traceroute, etc.).

Therefore, there exist a need to provide access control to different control points for performing an UPnP action (e.g., install action, uninstall action, start action, stop action, ping action and so on) based on ownership information associated with resources on which the UPnP action is invoked. That is, access control decisions are taken based on which control point is the owner of a resource.

SUMMARY OF THE INVENTION

Accordingly, the present invention has been made to solve the above-stated problems occurring in the prior art, and provides a method and system for providing security to Universal Plug and Play (UPnP) operations in a home network environment based on ownership rights.

According to an aspect of the present invention, a request is received from a Control Point (CP) to perform an UPnP action associated with an UPnP resource. It is determined whether the CP holds an ownership right to perform the UPnP action based on ownership data associated with the UPnP resource. Accordingly, the CP is authorized to execute the UPnP action on the UPnP resource or an error message is returned to the CP based on the ownership of the UPnP resource.

According to an aspect of the present invention, there is provided a method of providing security for UPnP operations in a home network environment including one or more control points and one or more control devices, the method including receiving a request from a control point to perform at least one UPnP action associated with an UPnP resource, determining whether the control point holds an ownership right to perform the at least one UPnP action based on ownership data associated with the UPnP resource, when determining that the control point holds the ownership right, authorizing the control point to perform the UPnP action on the UPnP resource, and when determining that the control point does not hold the ownership right, returning an error message on a display of the control point.

According to another aspect of the present invention, there is provided an apparatus for providing security for UPnP operations in a home network environment including one or more control points and one or more control devices, the apparatus including a memory coupled to the processor and is configured to temporarily store instructions to be executed by the processor and a processor configured to receive a request from a control point to perform at least one UPnP action associated with an UPnP resource, determine whether the control point holds an ownership right to perform the at least one UPnP action based on ownership data associated with the UPnP resource, when determining that the control point holds the ownership right, authorizing the control point to perform the UPnP action on the UPnP resource, and when determining that the control point does not hold the ownership right, returning an error message on a display of the control point.

According to yet another aspect of the present invention, there is provided a non-transitory computer-readable storage medium having instructions stored therein, executed by a control device, for executing a method for providing security for UPnP operations in a home network environment, the method including receiving a request from a control point to perform at least one UPnP action associated with an UPnP resource, determining whether the control point holds an ownership right to perform the at least one UPnP action based on ownership data associated with the UPnP resource, when determining that the control point holds the ownership right, authorizing the control point to perform the UPnP action on the UPnP resource, and when determining that the control point does not hold the ownership right, returning an error message on a display of the control point.

According to still another aspect of the present invention, there is provided a home network system including at least one control point configured to invoke at least one UPnP action associated with an UPnP resource, and at least one control device communicatively coupled to the at least one control point configured to determine whether the at least one control point holds an ownership right to perform the at least one UPnP action based on ownership data associated with the UPnP resource, and authorizing the at least one control point to perform the UPnP action on the UPnP resource based on the determination.

According to another aspect of the present invention, there is provided a method of providing security for UPnP operations in a home network environment including one or more control points and one or more control devices, the method including receiving a request from a control point to perform a first UPnP action associated with an UPnP resource, determining whether the control point holds a role to perform the first UPnP action associated with the UPnP resource, when determining that the control point holds the role to perform the first UPnP action, authorizing the control point to perform the first UPnP action on the UPnP resource and setting the control point as an owner of the UPnP resource, receiving a request from a control point to perform a second UPnP action on the UPnP resource, determining whether the control point holds an ownership right to perform the second UPnP action based on ownership of the UPnP resource, when determining that the control point holds the ownership right, authorizing the control point to perform the second UPnP action on the UPnP resource, and when determining that the control point does not hold the ownership right, returning an error message on a display of the control point.

According to another aspect of the present invention, there is provided an apparatus for providing security for UPnP operations in a home network environment including one or more control points and one or more control devices, the apparatus including a memory coupled to a processor and is configured to temporarily store instructions to be executed by the processor, and the processor configured to receive a request from a control point to perform a first UPnP action associated with an UPnP resource, determine whether the control point holds a role to perform the first UPnP action associated with the UPnP resource, when determining that the control point holds the role to perform the first UPnP action, authorizing the control point to perform the first UPnP action on the UPnP resource and set the control point as an owner of the UPnP resource, receiving a request from a control point to perform a second UPnP action on the UPnP resource, determining whether the control point holds an ownership right to perform the second UPnP action based on ownership of the UPnP resource, when determining that the control point holds the ownership right, authorizing the control point to perform the second UPnP action on the UPnP resource, and when determining that the control point does not hold the ownership right, returning an error message on a display of the control point.

BRIEF DESCRIPTION OF THE DRAWINGS

The above and/or other aspects, features and advantages of the present invention will be more apparent from the following detailed description taken in conjunction with the accompanying drawings, in which.

DETAILED DESCRIPTION OF THE EMBODIMENTS OF THE PRESENT INVENTION

Hereinafter, various embodiments of the present invention will be described in detail with reference to the accompanying drawings. The present invention provides a method and system for providing security for Universal Plug and Play (UPnP) operations in a home network environment based on ownership rights.

The terms 'UPnP action ' and 'UPnP operation' are used interchangeably throughout the description.

Figure 1:
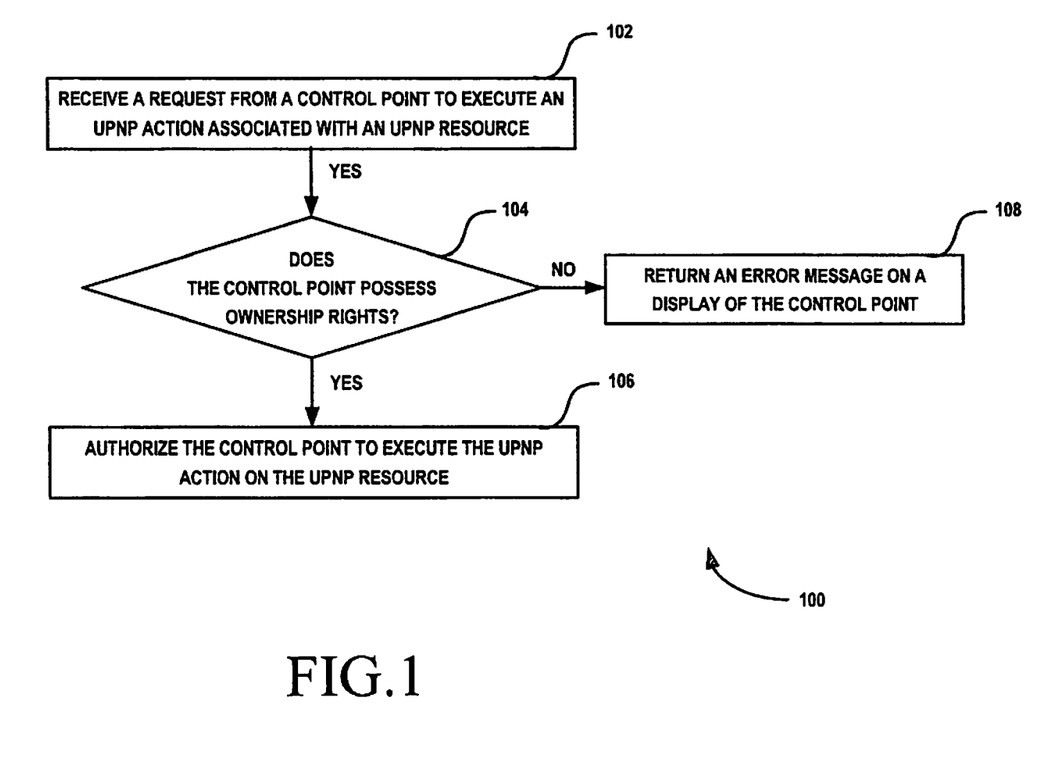
FIG. 1 is a flowchart illustrating a method of providing enhanced access control to different control points for performing Universal Plug and lay (UPnP) actions associated with various UPnP resources based on ownership rights, according to an embodiment of the present invention.

FIG. 1 is a flowchart 100 illustrating a method of providing enhanced access control to different control points for performing UPnP actions associated with various UPnP resources based on ownership rights, according to an embodiment of the present invention. In Step 102, a request to perform an UPnP action associated with an UPnP resource (e.g., Deployment Unit (DU), Execution Unit (EU), or diagnostic test) is received from a control point by a control device. For example, a request to install a DU is received from the control point. In this case, the UPnP action is an install action associated with a device management service (e.g., a DM software management service) and the UPnP resource includes DU.

In Step 104, it is determined whether the control point holds an ownership right to perform the UPnP action based on ownership data associated with the UPnP resource. In one embodiment, the ownership data indicates an implicit ownership of the UPnP resource. That is, the ownership data indicates an identifier associated with a control point having an ownership right assigned when previous UPnP action was performed on the UPnP resource. Here, it is determined whether the control point has previously performed an associated UPnP action on the UPnP resource and an ownership right was implicitly assigned to the control point at that time.

The ownership data is maintained in an ownership database. The ownership data includes a set of ownership roles that indicates ownership right possessed by a control point to perform an UPnP action on an UPnP resource. Here, the ownership data associated with the at least one UPnP action is retrieved from the ownership database. Also, a role associated with the control point is retrieved from the received request. Then, it is determined whether the control point holds the ownership right by matching the role of the control point with the retrieved ownership data.

If the control point holds the ownership right, then in Step 106, the control point is authorized to perform the UPnP action on the UPnP resource. Otherwise, an error message is returned on the display of the control point, in Step 108.

Figure 2:
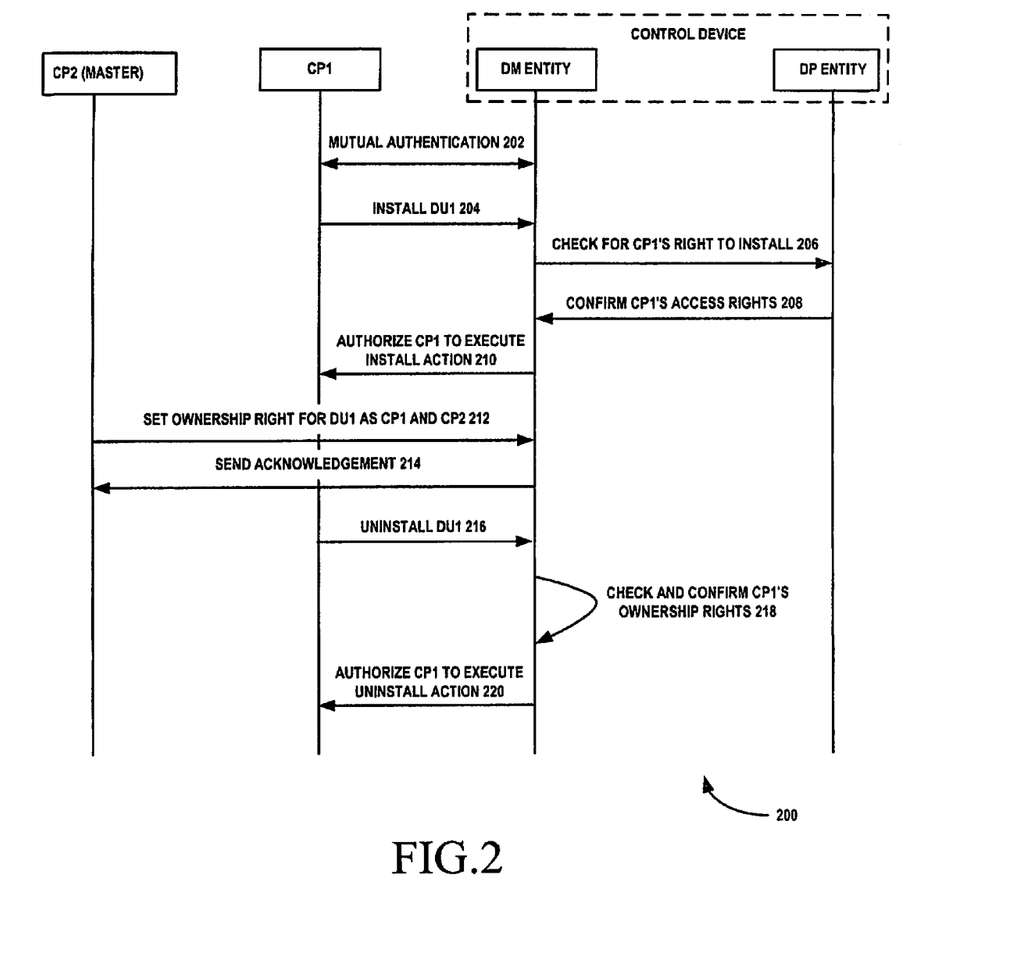
FIG. 2 is a flow diagram illustrating a method of creating and managing an ownership database using UPnP actions associated with an UPnP resource and securing UPnP actions using ownership information, according to an embodiment of the present invention.

FIG. 2 is a flow diagram 200 illustrating a method of creating and managing an ownership database using UPnP actions associated with an UPnP resource and securing the UPnP actions using the ownership information, according to an embodiment of the present invention. Here CP2 is an ownership controller for controlling ownership rights of a plurality of control points in a home network environment. In Step 202, device management (DM) entity and CP1 are mutually authenticated. In Step 204, the CP1 sends a request to install a deployment unit type application (DU1) to the DM entity.

In Step 206, the DM entity checks with the DP entity whether the CP1 possess an access right for performing the install action. In one embodiment, the DP entity determines whether the role associated with the CP1 is in the recommended role list. If the role does not exist, then the argument based Access Control List (ACL) is checked to determine CP1's right to install. In Step 208, the DP entity confirms that CP1 has an access rights for installing DU1. In Step 210, the DM entity authorizes the CP1 to install the DU1 and provides confirmation to the CP1 when the DU1 is successfully installed.

In Step 212, the CP2 sets ownership rights associated with the DU1 as CP1 and CP2. In Step 214, the DM entity acknowledges that the ownership rights associated with the DU1 are successfully set. When that the CP1 wishes to uninstall the DU1, in Step 216, the CP1 sends a request for uninstalling the DU1 to the DM entity. In Step 218, the DM entity checks whether the CP1 possess an ownership right for executing the uninstall action. It can be noted that, the DM entity checks the ownership of the DU1 based on the ownership right set by CP2 in step 212. Accordingly, in Step 218, the DM entity confirms that CP1 holds ownership of the DU1. Thus, in Step 220, the DM entity authorizes the CP1 to uninstall the DU1 upon confirming the ownership right and provides confirmation to the CP1 when the DU1 is successfully uninstalled.

Figure 3:
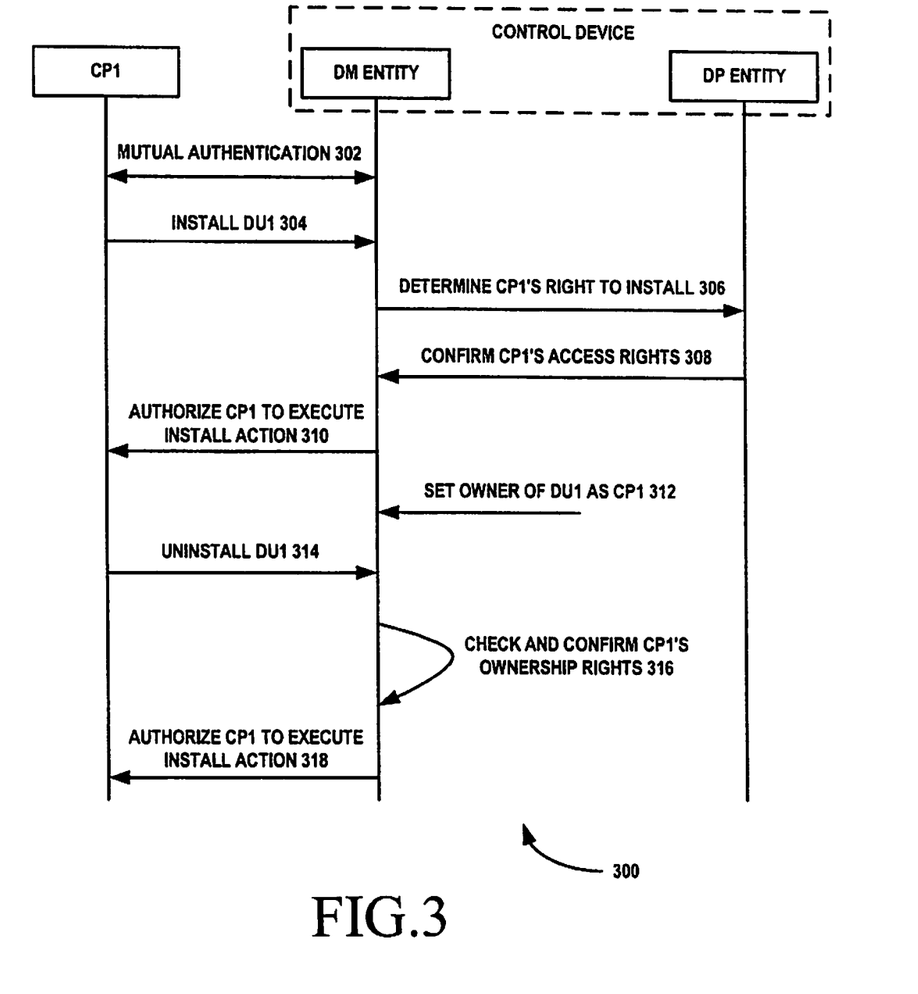
FIG. 3 is a flow diagram illustrating a method of setting a control point as an owner of an UPnP resource and authorizing the control point to perform an UPnP action on the UPnP resource based on ownership rights, according to an embodiment of the present invention.

FIG. 3 is a flow diagram illustrating a method of setting a control point as an owner of an UPnP resource and authorizing the control point to perform an UPnP action on the UPnP resource based on ownership rights, according to an embodiment of the present invention. In Step 302, the DM entity and CP1 are mutually authenticated. In Step 304, the CP1 sends a request to install a DU type application (DU1) to the DM entity.

In Step 306, the DM entity checks with the DP entity whether the CP1 possess an access right for executing the install action. In Step 308, the DP entity confirms that CP1 has an access right to perform the install action. In one embodiment, the DP entity determines whether the role associated with the CP1 is in the recommended role list. If the role does not exist, then the argument based Access Control List (ACL) is checked to determine CP1's right to install. In Step 310, the DM entity authorizes the CP1 to install the DU1 and provides confirmation to the CP1 when the DU1 is successfully installed. In Step 312, the DM entity sets CP1 as owner of the DU1 since the CP1 has successfully performed the install action.

When the CP1 wishes to uninstall the DU1, in Step 314, the CP1 sends a request for uninstalling the DU1 to the DM entity. In Step 316, the DM entity checks whether the CP1 possess an ownership right for executing the uninstall action. The DM entity confirms that CP1 has an ownership right to perform the uninstall action based on the ownership right set in step 312. In Step 318, the DM entity authorizes the CP1 to uninstall the DU1 and provides confirmation to the CP1 when the DU1 is successfully uninstalled.

Figure 4:
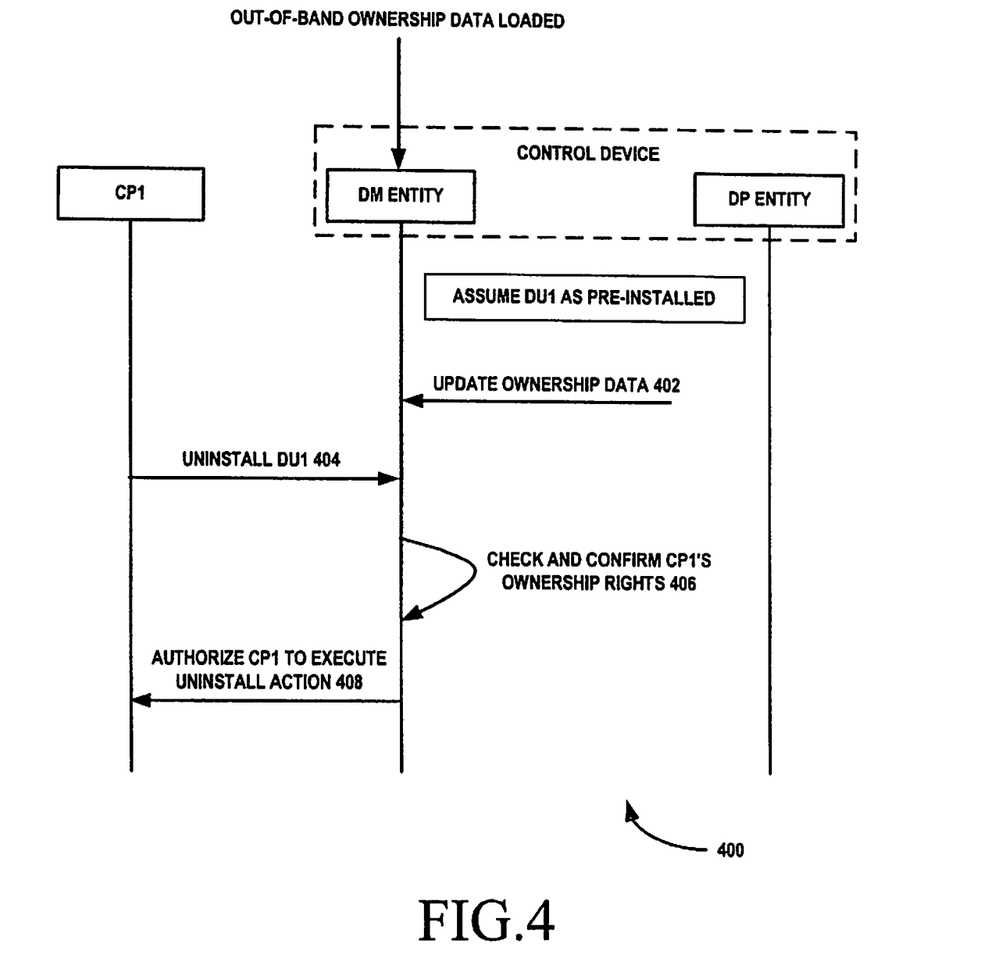
FIG. 4 is a flow diagram illustrating a method of securing UPnP actions associated with an UPnP resource when ownership data is provided through out-of-band communication channel, according to an embodiment of the present invention.

FIG. 4 is a flow diagram 400 illustrating a method of securing UPnP actions associated with an UPnP resource when ownership data is provided through out-of-band communication channel, according to an embodiment of the present invention. Here, ownership data associated with a Device Protection (DP) service is delivered out-of-band to a Device Management (DM) entity and the DU1 is pre-installed.

In Step 402, the DM entity updates the ownership data associated with the CP1 received through the out-of-band channel. When the CP1 wishes to uninstall DU1, in Step 404, the CP1 sends a request for uninstalling the DU1 to the DM entity. In Step 406, the DM entity checks whether the CP1 possess an ownership right for executing the uninstall action. It can be noted that, the updated ownership data in Step 402 indicates that CP1 is owner of the DU1. Accordingly, in Step 406, the DM entity confirms that CP1 has an ownership right to perform the uninstall action. In Step 408, the DM entity authorizes the CP1 to uninstall the DU1 and provides confirmation to the CP1 when the DU1 is successfully uninstalled.

Figure 5:
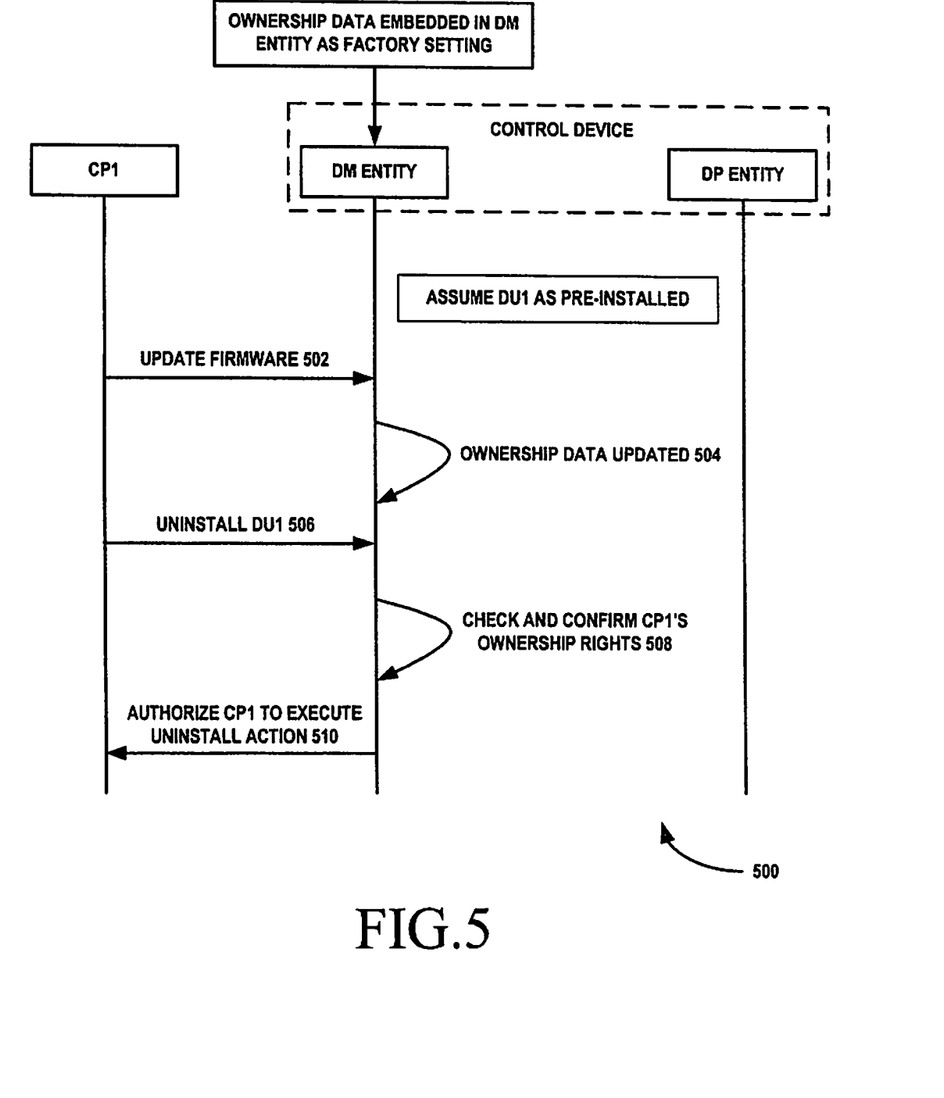
FIG. 5 is a flow diagram illustrating a method of securing UPnP actions associated with an UPnP resource when ownership data is embedded as factory setting and is updated using firmware update in a control device, according to an embodiment of the present invention.

FIG. 5 is a flow diagram 500 illustrating a method of securing UPnP actions associated with an UPnP resource when ownership data is embedded as factory setting in a control device and is updated using firmware update, according to an embodiment of the present invention. Here, ownership data associated with a Device Protection (DP) service is embedded in the control device having a Device Management (DM) entity and the DP entity as factory setting and that the DU1 is pre-installed. In Step 502, the CP1 sends a request to update firmware to the DM entity. In Step 504, the DM entity updates the factory setting with new ownership data associated with the CP1 during the modular firmware update.

When, the CP1 wishes to uninstall the DU1. In this case, in Step 506, the CP1 sends a request for uninstalling the DU1 to the DM entity. In Step 508, the DM entity checks whether the CP1 possess an ownership right for executing the uninstall action. Since the updated ownership data indicates that CP1 is the owner of DU1, in Step 508, the DM entity confirms the ownership right of the CP1 to perform the uninstall action. Accordingly, in Step 510, the DM entity authorizes the CP1 to uninstall the DU1 and provides confirmation to the CP1 when the DU1 is successfully uninstalled. Although, FIGS. 2 through 5 illustrate examples associated with DU and DU installation, it is understood that the above-described scenarios are equally applicable to diagnostic tests such as ping, trace route, and bandwidth tests.

Figure 6:
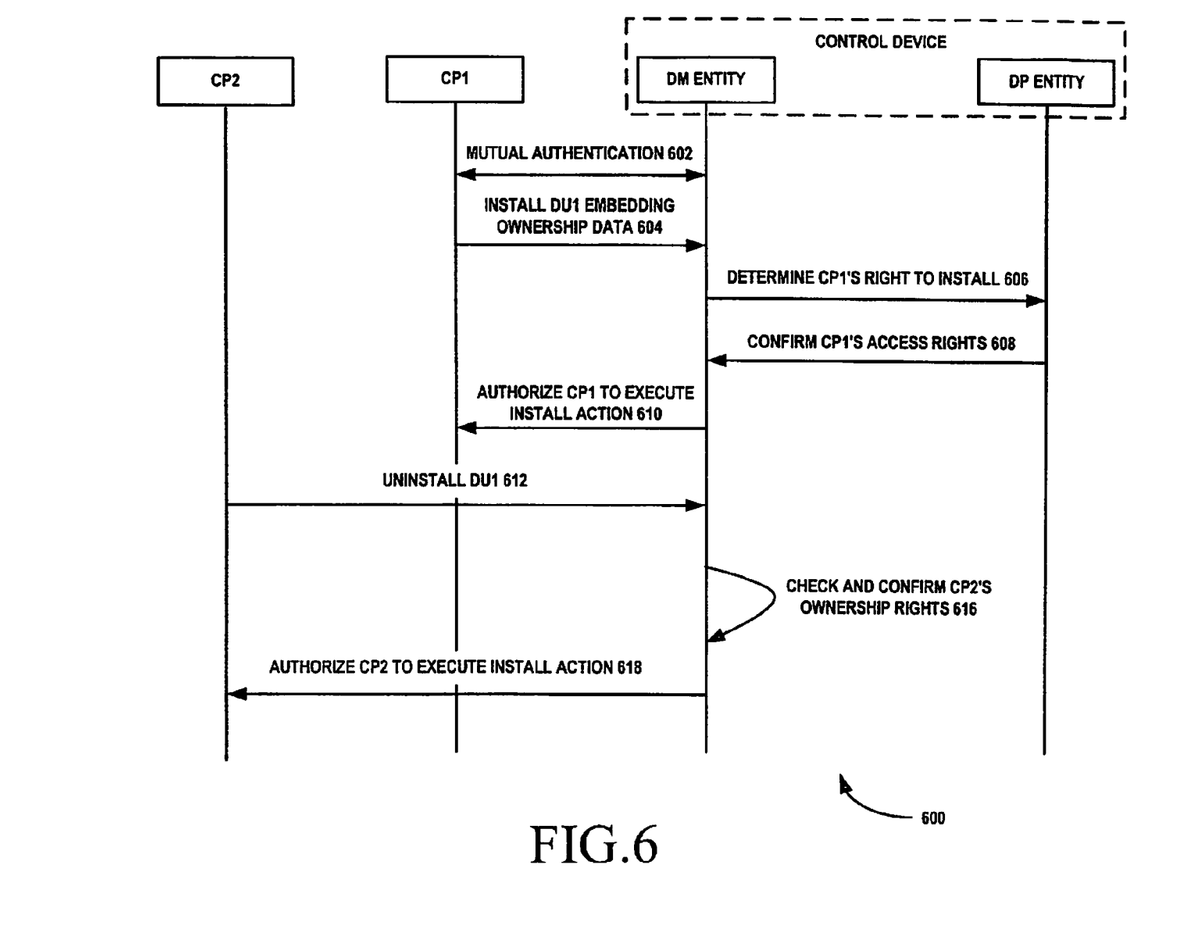
FIG. 6 is a flow diagram illustrating a method of securing UPnP actions associated with an UPnP resource when ownership data is embedded in deployment unit/execution unit, according to an embodiment of the present invention.

FIG. 6 is a flow diagram 600 illustrating a method of securing UPnP actions associated with an UPnP resource when ownership data is embedded in deployment unit (DU)/execution unit EU), according to an embodiment of the present invention. Here, the control device is already having limited ownership data and the DU/EU to be installed contains additional ownership data associated with a Device Protection (DP) service and that the DU1 is pre-installed. In Step 602, the DM entity and CP1 are mutually authenticated. In Step 604, the CP1 sends a request to install a DU type application (DU1) embedding ownership data to the DM entity.

In Step 606, the DM entity checks with the DP entity whether the CP1 possess an access right for executing the install action. In Step 608, the DP entity confirms that CP1 has an access right to perform the install action. In one embodiment, the DP entity determines whether the role associated with the CP1 is in the recommended role list. If the role does not exist, then argument based Access Control List (ACL) is checked to determine CP1's right to install. In Step 610, the DM entity authorizes the CP1 to install the DU1 and provides confirmation to the CP1 when the DU1 is successfully installed.

When another control point (CP2) wishes to uninstall the Dill. In this case, in Step 612, the CP2 sends a request for uninstalling the DU1 to the DM entity. In Step 614, the DM entity checks whether the CP2 possess an ownership right for executing the uninstall action. Since the ownership data embedded in the DU1 indicates that the CP2 has an ownership right over DU1, the DM entity confirms that CP2 has an ownership right to perform the uninstall action in Step 614. Accordingly, in Step 616, the DM entity authorizes the CP2 to uninstall the DU1 and provides confirmation to the CP2 when the DU1 is successfully uninstalled.

Figure 7:
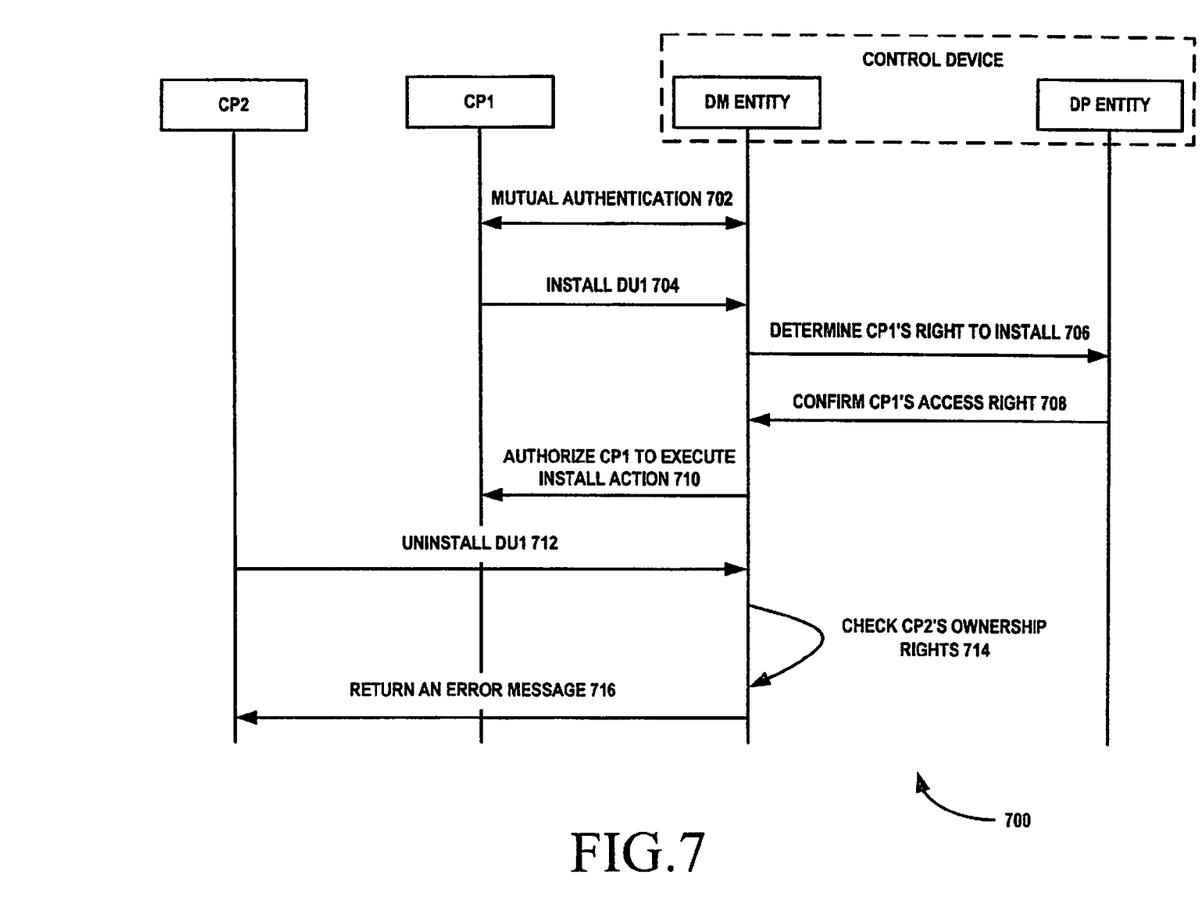
FIG. 7 is a flow diagram illustrating a method of returning an error message to a control point based on ownership rights when an unauthorized UPnP action is requested, according to an embodiment of the present invention.

FIG. 7 is a flow diagram 700 illustrating a method of returning an error message to a control point based on ownership right set when an unauthorized UPnP action is requested, according to an embodiment of the present invention. In Step 702, the DM entity and the CP1 are mutually authenticated. In Step 704, the CP1 sends a request to install a DU type application (DU1) to the DM entity.

In Step 706, the DM entity checks with the DP entity whether the CP1 holds an access right for executing the install action. In Step 708, the DP entity confirms that CP1 has access right to perform the install action. In one embodiment, the DP entity determines whether the role associated with the CP1 is in the recommended role list. If the role does not exist, then argument based Access Control List (ACL) is checked to determine CP1's right to install. In Step 710, the DM entity authorizes the CP1 to install the DU type application and provides confirmation to the CP1 when the DU1 is successfully installed.

When another control point (for example, CP2) wishes to uninstall the DU1 application installed by CP1, the control point sends a request to the DM entity to execute an uninstall action for uninstalling the DU1, in Step 712. In Step 714, the DM entity checks whether the CP2 possess an ownership right for executing the uninstall action. Since the CP1 has installed the DU1, the DM entity confirms that CP1 holds the ownership over the DU1, in Step 714. Consequently, in Step 716, the DM entity returns an error message on the display of the CP2 rejecting the request to uninstall the DU1. Although, FIG. 6 depicts a scenario for installing and uninstalling a DU type application, it is understood by the person skilled in the art that similar method steps as described herein are applicable for diagnostic tests and EU.

Figure 8:
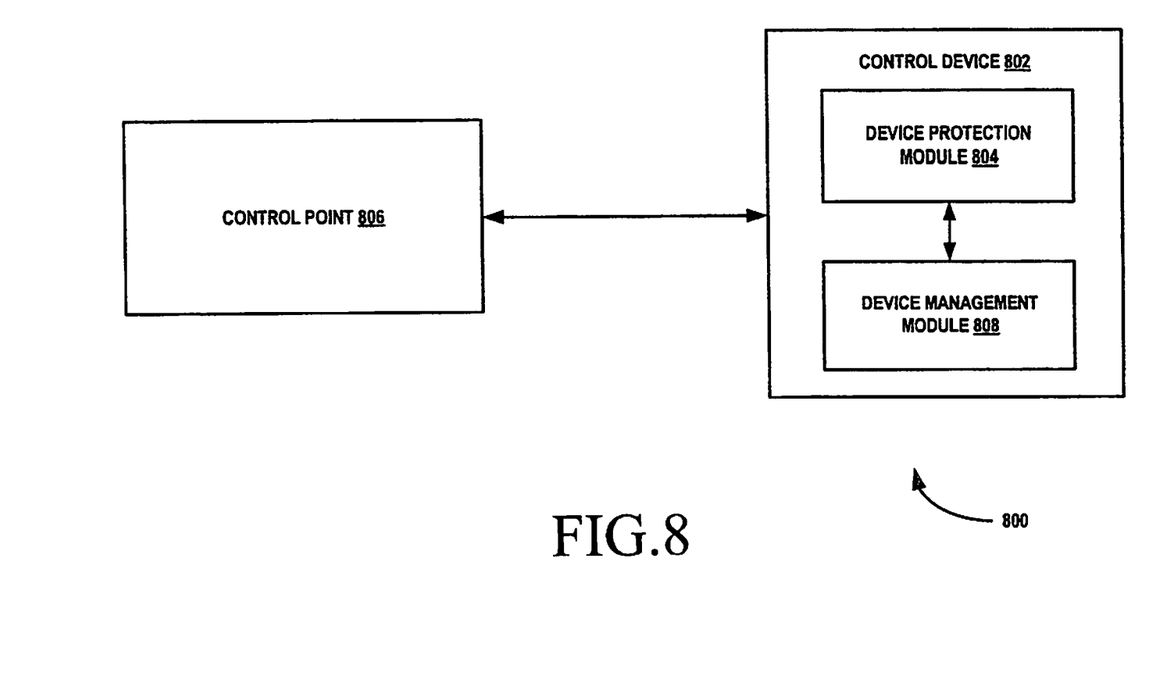
FIG. 8 is a block diagram illustrating a home network system for providing security to UPnP actions based on ownership rights, according to an embodiment of the present invention.

FIG. 8 is a block diagram illustrating a home network system 800 for providing security to UPnP actions based on ownership rights, according to an embodiment of the present invention. In FIG. 8, the home network system 800 includes a control device 802 and a control point 806. According to an aspect of the present invention, the control device 802 includes a device protection module 804 and a device management module 808.

The control point 806 invokes an UPnP action associated with an UPnP resource. The device management module 804 determines whether the control point 806 possess an ownership right to perform the UPnP action based on ownership data associated with the UPnP resource. Based on the determination, the device management module 808 authorizes the control point 806 to execute the UPnP action on the UPnP resource. The device protection module 804 and the device management module 808 together can provide security to UPnP actions based on ownership rights in accordance with the one or more embodiments illustrated in FIGS. 1-7.

Figure 9:
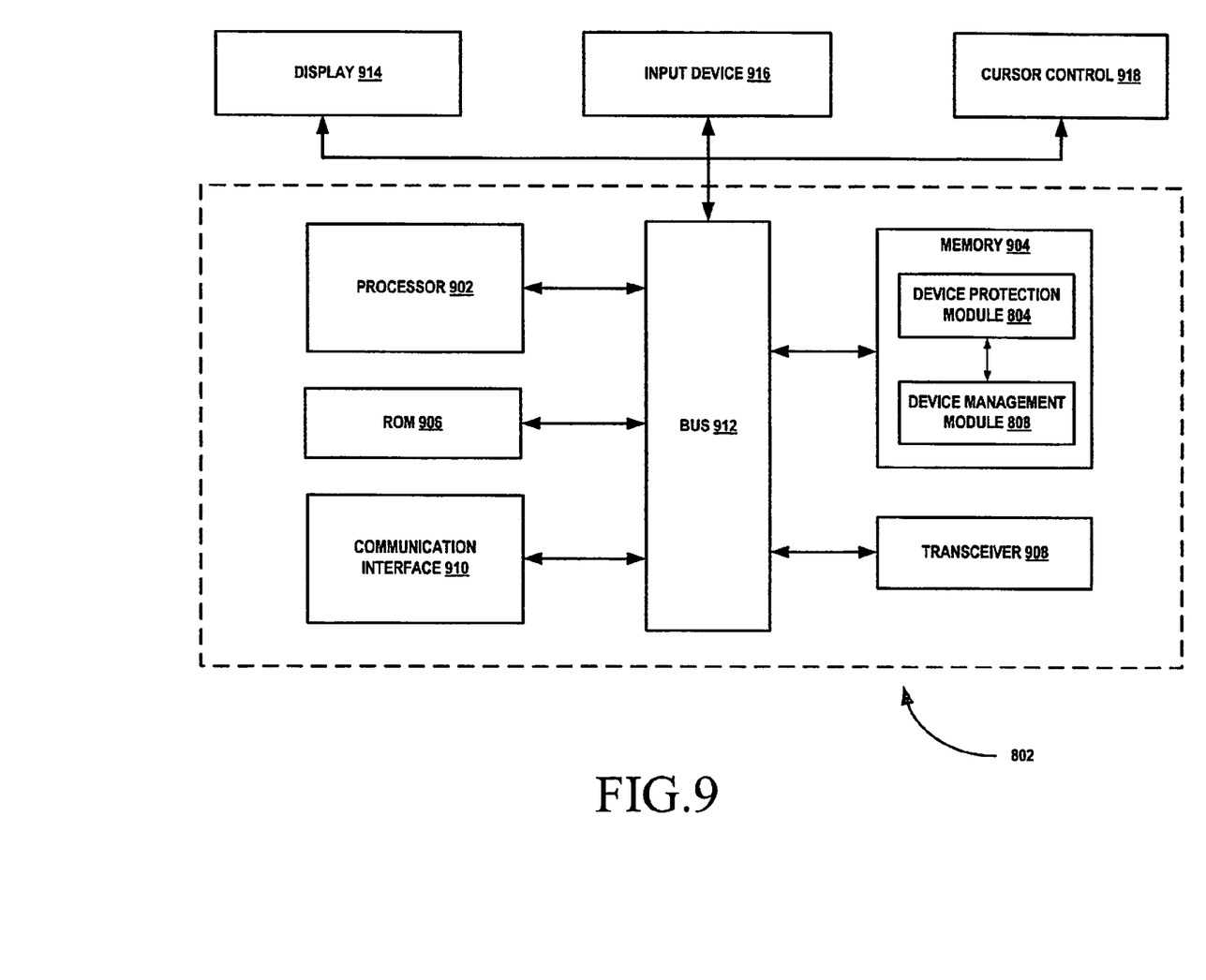
FIG. 9 is a block diagram illustrating various components of a control device of the home network system such as those illustrated in FIG. 8 for implementing embodiments of the present invention.

FIG. 9 is a block diagram illustrating various components of the control device 802 of the home network system 800 such as those illustrated in FIG. 8 for implementing embodiments of the present invention. In FIG. 9, the control device 802 includes a processor 902, memory 904, a Read Only Memory (ROM) 906, a transceiver 908, a bus 910, a communication interface 912, a display 914, an input device 916, and a cursor control 918.

The processor 902 includes any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as generic or programmable logic devices or arrays, application specific integrated circuits, single-chip computers, smart cards, and the like.

The memory 904 and the ROM 906 include volatile memory and non-volatile memory. The memory 904 includes the device protection module 804 and a device management module 808 for providing security to UPnP actions in the home network environment 800 based on ownership rights, according to one or more embodiments described in FIGS. 1 through 8. A variety of computer-readable storage media is stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks, and the like.

Embodiments of the present invention may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 902. For example, a computer program may include machine-readable instructions capable of providing security for UPnP actions in the home network environment 800 based on ownership rights, according to the teachings and herein described embodiments of the present invention. In one embodiment, the program may be included on a Compact Disk-Read Only Memory (CD-ROM) and loaded from the CD-ROM to a hard drive in the non-volatile memory. The machine-readable instructions may cause the control device 802 to encode according to the various embodiments of the present invention.

The transceiver 908 is capable of receiving a request to execute an UPnP action on an UPnP resource and authorizing the control point 806 to execute the UPnP action on the UPnP resource. The bus 910 acts as interconnect between various components of the control device 802. The components such as communication interfaces 912, the display 914, the input device 916, and the cursor control 918 are well known to the person skilled in the art and hence the explanation is thereof omitted.

Various devices, modules, selectors, estimators, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

While the present invention has been shown and described with reference to various embodiments thereof, it will be understood by those skilled in the art that various changes in form and detail may be made therein without departing from the spirit and scope of the invention as defined by the appended claims and their equivalents.

The invention claimed is:

1. A method of providing security for operations in a home network environment including one or more control points and one or more control devices, the method comprising:
    receiving a request from a control point of the home network environment to perform an install action associated with a first application;
    determining whether the control point holds an access right to perform the install action based on a predetermined list;
    allowing the control point to perform the install action associated with the first application, when determining that the control point holds the access right to perform the install action;
    automatically assigning an ownership right of the first application to the control point having performed the install action associated with the first application;
    returning an error message to the control point, when determining that the control point does not hold the access right;
    receiving a request from the control point to perform an uninstall action for uninstalling a second application;
    uninstalling the second application, when determining that the control point holds an ownership right of the second application automatically assigned to the control point having previously performed an install action associated with the second application; and
    returning an error message to the control point, when determining that the control point does not hold the ownership right of the second application.

2. The method of claim 1, wherein each of the first and second applications includes a corresponding one of a deployment unit type application, an execution unit type application, and a diagnostic test type application.

3. The method of claim 1, wherein determining that the control point holds an ownership right of the second application automatically assigned to the control point having previously performed the install action associated with the second application is performed according to whether an ownership data associated with the second application indicates an identifier associated with the control point set as an owner of the second application based on the previous install action on the second application.

4. The method of claim 3, wherein determining the ownership data associated with the second application is maintained in an ownership database.

5. The method of claim 4, wherein the ownership data includes a set of ownership roles, and each of the set of ownership roles indicates an ownership right assigned to each of the one or more control points for executing an action.

6. An apparatus for providing security for operations in a home network environment including one or more control points and one or more control devices, the apparatus comprising:
    a memory coupled to a processor and configured to temporarily store instructions to be executed by the processor; and
    the processor configured to:
    receive a request from a control point of the home network environment to perform an install action associated with a first application;
    determine whether the control point holds an access right to perform the install action based on a predetermined list;
    allow the control point to perform the install action associated with the first application, when determining that the control point holds the access right to perform the install action;
    automatically assign an ownership right of the first application to the control point having performed the install action associated with the first application;
    return an error message to the control point, when determining that the control point does not hold the access right;
    receive a request from the control point to perform an uninstall action for uninstalling a second application;
    uninstall the second application, when determining that the control point holds an ownership right of the second application automatically assigned to the control point having previously performed an install action associated with the second application; and return an error message to the control point, when determining that the control point does not hold the ownership right of the second application.

7. The apparatus of claim 6, wherein each of the first and second applications includes a corresponding one of a deployment unit type application, an execution unit type application, and a diagnostic test type application.

8. The apparatus of claim 6, wherein an ownership data associated with the second application indicates an identifier associated with the control point set as an owner of the second application based on the previous install action on the second application.

9. The apparatus of claim 8, further comprising an ownership database configured to store the ownership data associated with the second application.

10. The apparatus of claim 9, wherein the ownership data includes a set of ownership roles, and each set of ownership roles indicates an ownership right assigned to each of the one or more control points for performing an action.

11. An apparatus for providing security for operations in a home network environment including one or more control points and one or more control devices, the apparatus comprising:
  a memory coupled to a processor and configured to temporarily store instructions to be executed by the processor; and
  the processor configured to:
  receive a request from a first control point of the home network environment to perform an install action associated with a first application;
  determine whether the first control point holds an access right to perform the install action based on a predetermined list;
  allow the control point to perform the install action associated with the first application, when determining that the first control point holds the access right to perform the install action;
  automatically assign an ownership right of the first application to the control point having performed the install action associated with the first application;
  return an error message to the first control point, when determining that the first control point does not hold the access right;
  receive a request from a second control point to perform an uninstall action for uninstalling a second application;
  uninstall the second application, when determining that the control point holds an ownership right of the second application automatically assigned to the control point having previously performed an install action associated with the second application; and
  return an error message to the second control point, when determining that the control point does not hold the ownership right of the second application.

12. The apparatus of claim 11, wherein each of the first and second applications includes a corresponding one of a deployment unit type application, an execution unit type application, and a diagnostic test type application.

13. The apparatus of claim 11, wherein an ownership data associated with the second application indicates an identifier associated with the second control point set as an owner of the second application based on the previous install action on the second application.

* * * * *